(12) United States Patent
Law et al.

(10) Patent No.: US 12,406,509 B2
(45) Date of Patent: Sep. 2, 2025

(54) VEHICLE MOUNTED LIVENESS DETECTION SYSTEM, LIVENESS DETECTION METHOD AND APPARATUS

(71) Applicant: Black Sesame Technologies Inc., San Jose, CA (US)

(72) Inventors: Roy Law, San Diego, CA (US); Jianen Wu, Shenzhen (CN); Ziqin Chen, Shenzhen (CN)

(73) Assignee: Black Sesame Technologies Inc., San Jose, CA (US)

( * ) Notice: Subject to any disclaimer, the term of this patent is extended or adjusted under 35 U.S.C. 154(b) by 446 days.

(21) Appl. No.: 17/751,933

(22) Filed: May 24, 2022

(65) Prior Publication Data

US 2023/0057975 A1 Feb. 23, 2023

(30) Foreign Application Priority Data

Aug. 18, 2021 (CN) .......................... 202110949418.7

(51) Int. Cl.
*G06V 20/59* (2022.01)
*G01S 13/56* (2006.01)
(Continued)

(52) U.S. Cl.
CPC .............. *G06V 20/59* (2022.01); *G01S 13/56* (2013.01); *G01S 13/867* (2013.01);
(Continued)

(58) Field of Classification Search
CPC ........ G06V 20/59; G06V 40/40; G01S 13/56; G01S 13/867; G01S 13/886;
(Continued)

(56) References Cited

U.S. PATENT DOCUMENTS

| 10,467,873 | B2 * | 11/2019 | Chen | .................... | H04W 4/023 |
| 11,543,511 | B2 * | 1/2023 | Murata | ................ | B60N 2/0035 |
| 2007/0025597 | A1 | 2/2007 | Breed et al. | | |

FOREIGN PATENT DOCUMENTS

| CN | 106364442 A | 2/2017 |
| CN | 106534634 A | 3/2017 |

(Continued)

*Primary Examiner* — Neil R McLean
(74) *Attorney, Agent, or Firm* — Timothy T. Wang; Ni, Wang & Massand, PLLC

(57) ABSTRACT

A vehicle mounted liveness detection system, liveness detection method, apparatus, computer device and storage medium are disclosed. The system includes a Doppler microwave sensor, a camera and an alarm controller. The Doppler microwave sensor is configured to perform a liveness search on an in-vehicle space, obtain a liveness search data, and transmit the liveness search data to the alarm controller. The camera is configured to capture an in-vehicle image of the in-vehicle space and transmit the in-vehicle image to the alarm controller. The alarm controller is configured to perform a liveness detection on the liveness search data, perform a liveness detection on the in-vehicle image and perform an in-vehicle liveness alarm operation when a presence of liveness in the in-vehicle space is detected based on at least one of the liveness search data and the in-vehicle image.

9 Claims, 6 Drawing Sheets

Receiving a liveness search data obtained from a liveness search by a Doppler microwave sensor of the vehicle mounted liveness detecting system, and receiving an in-vehicle image captured by a camera of the vehicle mounted liveness detecting system — S402

Performing a liveness detecting on the liveness search data, and performing a liveness detecting on the in-vehicle image — S404

Performing an in-vehicle liveness alarm operation when a presence of liveness in the in-vehicle space is detected based on at least one of the liveness search data and the in-vehicle image — S406

(51) Int. Cl.
*G01S 13/86* (2006.01)
*G01S 13/88* (2006.01)
*G08B 21/02* (2006.01)
*H04N 7/18* (2006.01)
*B60R 25/102* (2013.01)
*B60R 25/30* (2013.01)
*B60R 25/31* (2013.01)

(52) U.S. Cl.
CPC ............ *G01S 13/886* (2013.01); *G08B 21/02* (2013.01); *H04N 7/183* (2013.01); *B60R 25/102* (2013.01); *B60R 25/305* (2013.01); *B60R 25/31* (2013.01)

(58) Field of Classification Search
CPC ....... G01S 13/931; G08B 21/02; G08B 21/24; G08B 29/188; G08B 21/22; H04N 7/183; H04N 7/188; B60R 25/102; B60R 25/305; B60R 25/31; B60R 21/01538; B60Q 9/00
USPC ......................................................... 382/103
See application file for complete search history.

(56) References Cited

FOREIGN PATENT DOCUMENTS

| | | | | |
|---|---|---|---|---|
| CN | 107264460 A | | 10/2017 | |
| CN | 109466442 A | * | 3/2019 | ............... B60Q 9/00 |
| CN | 212009808 U | | 11/2020 | |
| CN | 112277797 A | | 1/2021 | |
| WO | 2019114661 | | 6/2019 | |
| WO | 2020103267 A1 | | 5/2020 | |

* cited by examiner

VEHICLE MOUNTED LIVENESS DETECTION SYSTEM, LIVENESS DETECTION METHOD AND APPARATUS

CROSS REFERENCE TO RELATED APPLICATION

This patent application claims the benefit and priority of Chinese Patent Application No. CN 202110949418.7 filed on Aug. 18, 2021, the disclosure of which is incorporated by reference herein in its entirety as part of the present application.

TECHNICAL FIELD

The disclosure relates to the technical field of liveness detection, and more specifically, to a vehicle mounted liveness detection system, liveness detection method, apparatus, computer device and storage medium.

BACKGROUND ART

The popularity of vehicles has brought many conveniences to people's lives, but there are also some hidden dangers. For example, when parents leave children in the car, the unfortunate result can be child suffocation accidents. Another example is the theft of articles in the car when the driver forgets to lock the car when leaving.

In view of the above hidden dangers, there are technologies for liveness detection in vehicles. At present, the liveness detection technologies mainly rely on shooting the spaces in the vehicle through the vehicle mounted camera device, so as to detect the liveness according to the image of the space in the vehicle.

However, the field of view of the camera device is easily blocked by obstacles in the vehicle (for example, the seat blocks the field of view at the bottom of the rear seat of the vehicle). Moreover, the light environment in the car is unstable, and it may be impossible to accurately detect the liveness due to insufficient light.

Therefore, the existing liveness detection methods have the problem of low accuracy of liveness detection.

SUMMARY

In view of the above, it is necessary to provide a vehicle mounted liveness detection system, a liveness detection method, a liveness detection apparatus, and a computer device and a storage medium for the above technical problems.

A first aspect of the disclosure is to provide a vehicle mounted liveness detection system, including a Doppler microwave sensor, a camera and an alarm controller.

The Doppler microwave sensor is configured to perform a liveness search on an in-vehicle space, obtain a liveness search data, and transmit the liveness search data to the alarm controller.

The camera is configured to capture an in-vehicle image of the in-vehicle space and transmit the in-vehicle image to the alarm controller.

The alarm controller is configured to perform a liveness detection on the liveness search data and perform a liveness detection on the in-vehicle image.

The alarm controller is also configured to perform an in-vehicle liveness alarm operation when a presence of liveness in the in-vehicle space is detected based on at least one of the liveness search data and the in-vehicle image.

In one embodiment, the Doppler microwave sensor and the camera are both built with an Internet of things (IOT) module.

The Doppler microwave sensor is configured to transmit the liveness search data to the alarm controller through the IOTs module.

The camera is configured to transmit the in-vehicle image to the alarm controller through the IOTs module.

In one embodiment, the alarm controller is further specifically configured to:

determine that a presence of liveness in the in-vehicle space is detected based on the liveness search data when a first liveness detection result obtained by performing the liveness detection on the liveness search data meets a preset first alarm condition; and determine that a presence of liveness in the in-vehicle space is detected based on the in-vehicle image when a second liveness detection result obtained by performing the liveness detection on the in-vehicle image meets a preset second alarm condition.

In one embodiment, the alarm controller is further specifically configured to perform at least one of following in-vehicle liveness alarm operations.

The in-vehicle image is sent to a client to play the in-vehicle image at the client.

A liveness reminder message is sent to the client.

A telephone notification is performed according to a number of the client.

In one embodiment, the camera is further specifically configured to shoot a RGB in-vehicle image and/or an infrared in-vehicle image as the in-vehicle image.

The Doppler microwave sensor is further specifically configured to perform the liveness search using a signal within a liveness search frequency range. The liveness search frequency range is a frequency range of a signal for searching for a liveness.

In one embodiment, the alarm controller is further configured to send a liveness detection start instruction to the Doppler microwave sensor and the camera to trigger the Doppler microwave sensor to performing a liveness search on the in-vehicle space and trigger the camera to capture an in-vehicle image of the in-vehicle space when the vehicle is in a dangerous state. The dangerous state includes at least one of a locked state, a parked state and a flameout state.

A second aspect of the disclosure is to provide a liveness detection method applied to a vehicle mounted liveness detection system. The method includes the following steps.

A liveness search data obtained from a liveness search by a Doppler microwave sensor of the vehicle mounted liveness detection system is received, and an in-vehicle image captured by a camera of the vehicle mounted liveness detection system is received.

A liveness detection is performed on the liveness search data, and a liveness detection is performed on the in-vehicle image.

An in-vehicle liveness alarm operation is performed when a presence of liveness in the in-vehicle space is detected based on at least one of the liveness search data and the in-vehicle image.

A third aspect of the disclosure is to provide a liveness detection apparatus, including the following modules.

A data receiving module is configured to receive a liveness search data obtained by a liveness search by the Doppler microwave sensor of the vehicle mounted liveness detection system, and to receive an in-vehicle image captured by the camera of the vehicle mounted liveness detection system.

A liveness search module is configured to perform a liveness detection on the liveness search data and to perform a liveness detection on the in-vehicle image.

An alarm execution module is configured to perform an in-vehicle liveness alarm operation when a presence of liveness in the in-vehicle space is detected based on at least one of the liveness search data and the in-vehicle image.

A fourth aspect of the disclosure is to provide a computer device, including a memory on which a computer program is stored and a processor. The processor, when executing the computer program, implements the following steps.

A liveness search data obtained from a liveness search by a Doppler microwave sensor of the vehicle mounted liveness detection system is received, and an in-vehicle image captured by a camera of the vehicle mounted liveness detection system is received.

A liveness detection is performed on the liveness search data, and a liveness detection is performed on the in-vehicle image.

An in-vehicle liveness alarm operation is performed when a presence of liveness in the in-vehicle space is detected based on at least one of the liveness search data and the in-vehicle image.

A fifth aspect of the disclosure is to provide a computer readable storage medium having stored thereon a computer program. The computer program, when executed by a processor, implements the following steps.

A liveness search data obtained from a liveness search by a Doppler microwave sensor of the vehicle mounted liveness detection system is received, and an in-vehicle image captured by a camera of the vehicle mounted liveness detection system is received.

A liveness detection is performed on the liveness search data, and a liveness detection is performed on the in-vehicle image.

An in-vehicle liveness alarm operation is performed when a presence of liveness in the in-vehicle space is detected based on at least one of the liveness search data and the in-vehicle image.

For the above vehicle mounted liveness detection system, liveness detection method, apparatus, computer device and storage medium, the Doppler microwave sensor performs a liveness search on an in-vehicle space, obtains the liveness search data, and transmits the liveness search data to the alarm controller. At the same time, the camera captures the in-vehicle image of the in-vehicle space and transmits the in-vehicle image to the alarm controller. The alarm controller performs an in-vehicle liveness alarm operation when a presence of liveness in the in-vehicle space is detected based on at least one of the liveness search data and the in-vehicle image. Thus, through the fusion of two different liveness detection ways, the accuracy of liveness detection is improved.

DETAILED DESCRIPTION OF THE EMBODIMENTS

In order to make the purpose, technical scheme and advantages of the disclosure clearer, the disclosure is further described in detail below in combination with the attached drawings and embodiments. It should be understood that the specific embodiments described herein are only used to explain the disclosure and are not used to limit the disclosure.

Figure 1:
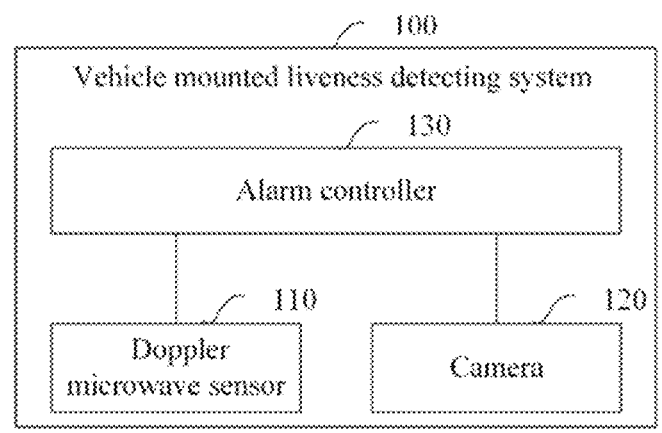
FIG. 1 is a structural block diagram of the vehicle mounted liveness detection system according to an embodiment.

In an embodiment, as shown in FIG. 1, a vehicle mounted liveness detection system 100 is provided. The vehicle mounted liveness detection system 100 can be set in a vehicle. The vehicle mounted liveness detection system 100 may specifically include a Doppler microwave sensor 110, a camera 120 and an alarm controller 130.

The Doppler microwave sensor 110 is configured to perform a liveness search on an in-vehicle space, obtain a liveness search data, and transmit the liveness search data to the alarm controller 130.

The camera 120 is configured to capture an in-vehicle image of the in-vehicle space and transmit the in-vehicle image to the alarm controller 130.

The alarm controller 130 is configured to perform a liveness detection on the liveness search data and perform a liveness detection on the in-vehicle image.

The alarm controller 130 is also configured to perform an in-vehicle liveness alarm operation when a presence of liveness in the in-vehicle space is detected based on at least one of the liveness search data and the in-vehicle image.

The Doppler microwave sensor 110 can detect moving objects based on the principle of Doppler radar. The Doppler microwave sensor 110 can radiate the X-band sinusoidal oscillation signal generated by the dielectric oscillator to the in-vehicle space through the transmitting antenna. When the electromagnetic wave in the in-vehicle space encounters a moving object, it scatters on the surface of the moving object. Part of the electromagnetic energy reaches the receiving antenna of the Doppler microwave sensor 110 through the reflection of the surface of the moving object. Based on the principle of Doppler effect, the reflected electromagnetic wave produces Doppler frequency shift, and the magnitude of the frequency shift is determined according to the speed of the moving object. The reflected frequency shift signal and the oscillation signal generated by the dielectric oscillator are mixed by the mixer of the Doppler microwave sensor 110 to generate the intermediate frequency signal. The intermediate frequency signal is amplified and filtered by the active filter in the controller of the Doppler microwave sensor 110 and sent to the A/D conversion port of the single chip for sampling. The single chip judges whether to find the moving target and outputs the corresponding alarm signal according to the comparison result between the sampling value and the reference threshold. Therefore, based on the operation principle of the Doppler microwave sensor 110 described above, the Doppler microwave sensor 110 can perform the liveness search on the in-vehicle space and obtain the liveness search data accordingly.

It can be seen from the operation principle of Doppler microwave sensor 110 that compared with camera based liveness search, the liveness search of Doppler microwave sensor is not affected by obstacles and light environment.

The camera 120 can take images and videos of the in-vehicle space as the above in-vehicle image.

Figure 2:
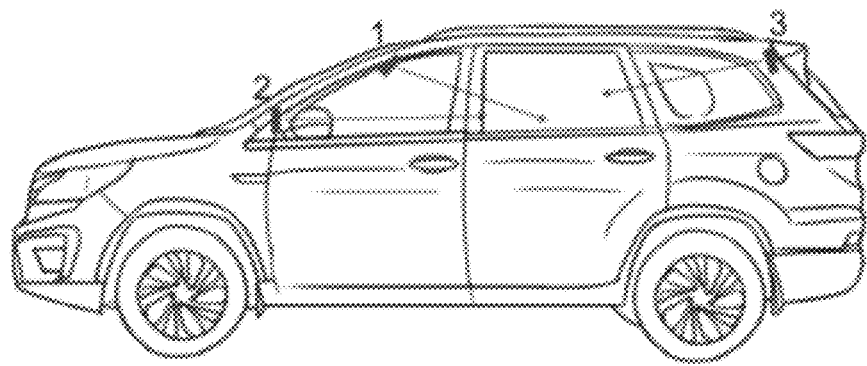
FIG. 2 is a schematic diagram of a deployment example of the vehicle mounted liveness detection system according to an embodiment.

FIG. 2 is a schematic diagram of a deployment example of the vehicle mounted liveness detection system according to an embodiment. As shown in the figure, positions 1, 2 and 3 can be used to set various components of the vehicle mounted liveness detection system 100. At least one of position 1, position 2 and position 3 can be provided with a Doppler microwave sensor 110. The sensing direction of the Doppler microwave sensor 110 at position 1 is backward towards the in-vehicle space (as shown by the arrows at position 1 and position 2 in the figure), and the sensing direction of the Doppler microwave sensor 110 at position 3 is forward towards the in-vehicle space (as shown by the arrow at position 3 in the figure). The camera 120 can be set at position 1, and its shooting direction is shown by the arrow of position 1 in the figure.

Those skilled in the art can understand that the above deployment mode of the vehicle mounted liveness detection system is only for illustration, and does not limit the setting position in the vehicle of various components in the vehicle mounted liveness detection system.

Specifically, the Doppler microwave sensor 110 may transmit liveness search data to the alarm controller 130. In addition, the camera 120 may also transmit the in-vehicle image to the alarm controller 130. The alarm controller 130 may perform a liveness detection based on the liveness search data and the in-vehicle image. The alarm controller 130 may detect whether there is a moving object in the current in-vehicle space according to the liveness search data to determine whether there is a liveness. The alarm controller 130 may also perform a living feature detect and semantic recognition on the in-vehicle image through the image preprocessing algorithm and deep learning method, so as to judge whether there are people, pets, etc.

When the alarm controller 130 detects the presence of a liveness in the in-vehicle space according to the liveness search data, or detects the presence of a liveness in the in-vehicle space according to the in-vehicle image, it performs the in-vehicle liveness alarm operation. That is, when a presence of liveness in the in-vehicle space is detected based on at least one of the liveness search data and the in-vehicle image, an in-vehicle liveness alarm operation is performed.

It should be noted that, on the one hand, camera-based liveness detection has the defect that it is easy to be affected by obstacles and light environment, and the Doppler microwave sensor not affected by obstacles and light environment can make up for this defect. On the other hand, the Doppler microwave sensor may run abnormally due to factors such as hardware abnormality, program error, signal environment and so on, which may affect the detection accuracy. Therefore, the Doppler microwave sensor and camera are set to operate at the same time for liveness detection, and the in-vehicle liveness alarm operation is performed when the presence of liveness in the in-vehicle space is detected according to any one of the liveness search data and the in-vehicle image. Therefore, the accuracy of liveness detection is improved by double insurance. While avoiding the problem that the liveness cannot be accurately detected due to the blocked field of view of the camera or insufficient light, it also avoids the problem that the liveness cannot be effectively detected due to the abnormal operation of the Doppler microwave sensor.

For the above vehicle mounted liveness detection system, the Doppler microwave sensor performs a liveness search on an in-vehicle space, obtains the liveness search data, and transmits the liveness search data to the alarm controller. At the same time, the camera captures the in-vehicle image of the in-vehicle space and transmits the in-vehicle image to the alarm controller. The alarm controller performs an in-vehicle liveness alarm operation when a presence of liveness in the in-vehicle space is detected based on at least one of the liveness search data and the in-vehicle image. Thus, through the fusion of two different liveness detection ways, the accuracy of liveness detection is improved.

Moreover, the Doppler microwave sensor is not easy to be affected by obstacles and light environment, and has strong robustness. It can effectively make up for the defects of the camera, so as to further improve the accuracy of liveness detection.

Furthermore, the Doppler microwave sensor is not easy to be affected by obstacles and light environment, and has no strict installation position requirements. It can be flexibly set at various positions in the vehicle, which reduces the installation cost of the system. Moreover, the setting of Doppler microwave sensor does not need to change the original hardware equipment in the vehicle, so that the system maintenance cost and system installation cost are low.

In an embodiment, the Doppler microwave sensor 110 and the camera 120 are both built with an IOT module. The Doppler microwave sensor 110 is configured to transmit the liveness search data to the alarm controller 130 through the IOT module. The camera 120 is configured to transmit the in-vehicle image to the alarm controller 130 through the IOT module.

The Doppler microwave sensor 110 and the camera 120 may have built-in IOT modules such as CAT1 (LTE UE-Category 1) and NB-IOT (Narrow Band Internet of Things) to communicate with the alarm controller 130. The Doppler microwave sensor 110 can transmit the liveness search data to the alarm controller 130 through the IOT module, and the camera 120 can transmit the in-vehicle image to the alarm controller 130 through the IOT module. Thus, the communication between various hardware devices in the system is realized at a lower cost.

In an embodiment, the alarm controller 130 is further specifically configured to:
  determine that a presence of liveness in the in-vehicle space is detected based on the liveness search data when a first liveness detection result obtained by performing the liveness detection on the liveness search data meets a preset first alarm condition; and
  determine that a presence of liveness in the in-vehicle space is detected based on the in-vehicle image when a second liveness detection result obtained by performing the liveness detection on the in-vehicle image meets a preset second alarm condition.

Specifically, during liveness detection, independent alarm triggering conditions can be set for Doppler microwave sensor 110 and camera 120 respectively. For the Doppler microwave sensor 110, the first alarm condition can be set. When the first liveness detection result obtained from the liveness detection of the liveness search data meets the first alarm condition, it is determined that there is a liveness in the in-vehicle space.

For example, the Doppler microwave sensor 110 transmits the newly obtained liveness search data once per second, and the alarm controller 130 performs the liveness detection on the liveness search data accordingly and generates the first liveness detection result. If the first liveness detection result for S consecutive seconds indicates that there is a moving object in the vehicle, the first liveness detection results meet the first alarm condition. At this time, the in-vehicle liveness alarm operation can be triggered.

Similarly, for the camera 120, the second alarm condition can be set. When the second liveness detection result obtained from the liveness detection based on the in-vehicle image meets the second alarm condition, it is determined that there is a liveness in the in-vehicle space.

For example, the camera 120 sends a newly captured in-vehicle image every second, and the alarm controller 130 correspondingly performs the liveness detection on the in-vehicle image and generates a second liveness detection result. If the second liveness detection result for S consecutive seconds indicates that there is a liveness in the vehicle, the second liveness detection result meets the second alarm condition. At this time, the in-vehicle liveness alarm operation can be triggered.

It should be noted that those skilled in the art can set the first alarm condition and the second alarm condition according to the actual situation (for example, the hardware performance of the respective sampling frequencies of the Doppler microwave sensor 110 and the camera 120). This embodiment does not limit the specific contents of the first alarm condition and the second alarm condition.

The above vehicle mounted liveness detection system sets the alarm conditions for the Doppler microwave sensor and camera respectively, so that the alarm conditions can be adapted to the characteristics of the respective detection ways of the Doppler microwave sensor and camera, and the problem that the alarm cannot be effectively alarmed due to the mismatch between the alarm conditions and the liveness detection ways can be avoided.

In an embodiment, the alarm controller 130 is further specifically configured to perform at least one of following in-vehicle liveness alarm operations. The in-vehicle image is sent to a client to play the in-vehicle image at the client. A liveness reminder message is sent to the client. A telephone notification is performed according to a number of the client.

Specifically, the alarm controller 130 can send the in-vehicle image (in the form of image and/or video) to the client, and the user can view the situation of the in-vehicle space through the client. The alarm controller 130 can also send a liveness reminder message to the client to remind the user that there is a liveness in the vehicle. The alarm controller 130 can also call the client according to the pre-stored number to remind the user that there is a liveness in the vehicle.

The vehicle mounted liveness detection system can notify the user of the presence of living bodies in the current vehicle in a flexible way by performing one or more of the following operations: sending in-vehicle images, sending liveness reminder messages and telephone notification, so as to avoid the user missing the liveness alarm.

In an embodiment, the camera is further specifically configured to shoot a RGB in-vehicle image and/or an infrared in-vehicle image as the in-vehicle image. The Doppler microwave sensor is further specifically configured to perform the liveness search using a signal within a liveness search frequency range. The liveness search frequency range is a frequency range of a signal for searching for a liveness.

The camera 120 may have an RGB image capturing function and/or an infrared image capturing function to capture an RGB in-vehicle image and/or an infrared in-vehicle image for the in-vehicle space. Through the liveness detection of RGB in-vehicle images and infrared in-vehicle images, the robustness of the in-vehicle liveness detection system 100 to the light environment can be improved, and the liveness detection can still be effectively carried out even in the environment with insufficient light (e.g., underground parking lot or night).

Figure 3:
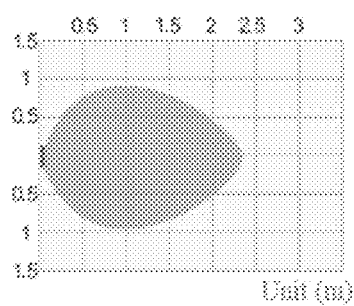
FIG. 3 is a schematic diagram of the sensing range of the Doppler microwave sensor according to an embodiment.

The Doppler microwave sensor 110 may perform liveness search using a signal within the liveness search frequency range. The signal within the liveness search frequency range can effectively detect the liveness. For example, the Doppler microwave sensor 110 can be set to transmit an oscillation signal with a frequency of 10 GHz, and its front sensing distance is about 2-3 m, which can effectively search the whole in-vehicle space and avoid the interference of moving objects outside the vehicle. FIG. 3 is a schematic diagram of the sensing range of a Doppler microwave sensor according to an embodiment. As shown in the figure, the sensing range of the front of the Doppler microwave sensor with 10 GHz oscillation signal can be close to 2.5 m, which is enough to cover the in-vehicle space, ensure the effective detection of living bodies in the in-vehicle space, and avoid the interference of moving objects outside the vehicle.

In addition, the use of signals within the frequency range of liveness detection can reduce the use cost of the Doppler microwave sensor 110.

In an embodiment, the alarm controller is further configured to send a liveness detection start instruction to the Doppler microwave sensor 110 and the camera 120 to trigger the Doppler microwave sensor 110 to performing a liveness search on the in-vehicle space and trigger the camera 130 to capture an in-vehicle image of the in-vehicle space when the vehicle is in a dangerous state. The dangerous state includes at least one of a locked state, a parking state and a flameout state.

Specifically, the alarm controller 130 can detect whether the vehicle is in a state, such as locking, parking, flameout, etc., where the driver may leave the vehicle resulting in a safety risk to the vehicle (for example, children are left unattended in the vehicle, and the goods in the vehicle are stolen). When the vehicle is in a dangerous state, the alarm controller 130 may trigger the Doppler microwave sensor 110 and the camera 120 to start operation for the liveness detection. On the one hand, it can reduce the personal and property safety risks in the vehicle. On the other hand, it can avoid the waste of hardware processing resources caused by liveness detection when the user does not leave the vehicle.

Figure 4:
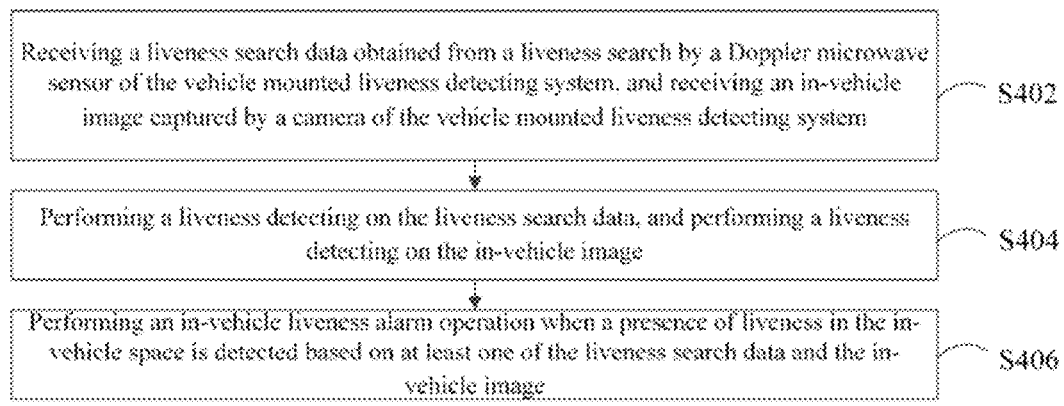
FIG. 4 is a flowchart of the liveness detection method according to an embodiment.

In an embodiment, as shown in FIG. 4, a liveness detection method applied to the vehicle mounted liveness detection system 100 is provided. The liveness detection method can be executed by the alarm controller 130 in the vehicle mounted liveness detection system 100. The method includes the following steps.

Step S402: receiving a liveness search data obtained from a liveness search by a Doppler microwave sensor of the vehicle mounted liveness detection system, and receiving an in-vehicle image captured by a camera of the vehicle mounted liveness detection system.

Step S404: performing a liveness detection on the liveness search data, and performing a liveness detection on the in-vehicle image.

Step S406: performing an in-vehicle liveness alarm operation when a presence of liveness in the in-vehicle space is detected based on at least one of the liveness search data and the in-vehicle image.

The specific limitation of the alarm controller 130 performing the above liveness detection method can be referred to the limitation of the vehicle mounted liveness detection system above, which will not be repeated here.

The liveness detection method provided above can be applied to the vehicle mounted liveness detection system provided by any of the above embodiments, and has corresponding functions and beneficial effects.

It should be understood that although the steps in the flowchart of FIG. 4 are displayed in order as indicated by the arrow, these steps are not necessarily performed in order as indicated by the arrow. Unless explicitly stated in the specification, there is no strict sequence restriction on the execution of these steps, and these steps can be executed in other sequences. Moreover, at least part of the steps in FIG. 4 may include multiple sub steps or stages, which are not necessarily completed at the same time, but can be executed at different times. The execution sequence of these sub steps or stages is not necessarily sequential, but can be executed in turn or alternately with at least part of other steps or sub steps or stages of other steps.

Figure 5:
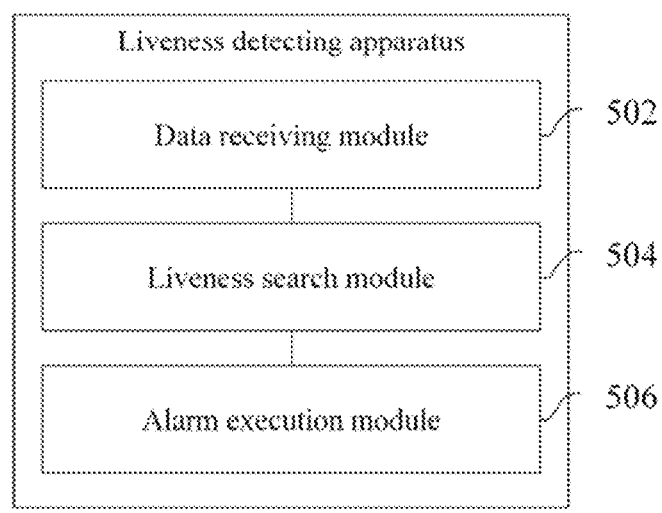
FIG. 5 is a structural block diagram of the liveness detection apparatus according to an embodiment.

In an embodiment, as shown in FIG. 5, a liveness detection apparatus is provided. The liveness detection apparatus includes the following modules.

A data receiving module 502 is configured to receive a liveness search data obtained by a liveness search by the Doppler microwave sensor of the vehicle mounted liveness detection system, and to receive an in-vehicle image captured by the camera of the vehicle mounted liveness detection system.

A liveness search module 504 is configured to perform a liveness detection on the liveness search data and to perform a liveness detection on the in-vehicle image.

An alarm execution module 506 is configured to perform an in-vehicle liveness alarm operation when a presence of liveness in the in-vehicle space is detected based on at least one of the liveness search data and the in-vehicle image.

The liveness detection apparatus may be specifically an alarm controller 130 of the vehicle mounted liveness detection system 100. The specific limitation of the liveness detection apparatus can be referred to the limitation of the vehicle mounted liveness detection method above, which will not be repeated here. Each module in the liveness detection apparatus can be realized in whole or in part by software, hardware and their combinations. The above modules can be embedded in or independent of the processor in the computer device in the form of hardware, or stored in the memory in the computer device in the form of software, so that the processor can call and execute the corresponding operations of the above modules.

The liveness detection apparatus provided above can be used to perform the liveness detection method provided by any of the above embodiments, and has corresponding functions and beneficial effects.

Figure 6:
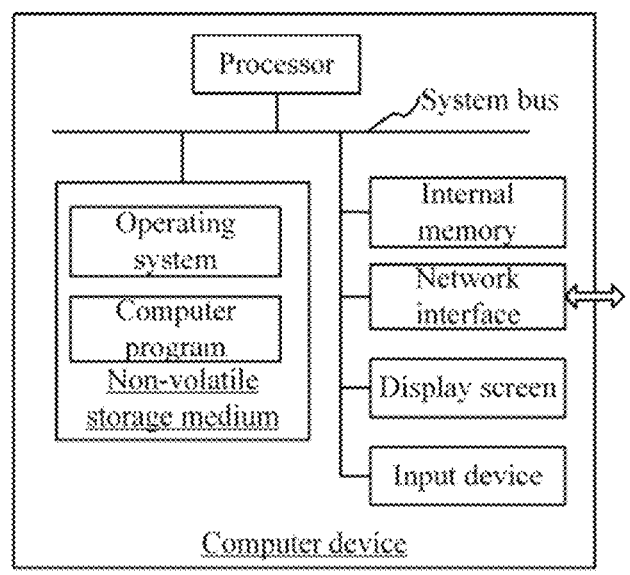
FIG. 6 is an internal structure diagram of the computer device according to an embodiment.

In an embodiment, a computer device is provided, which may be a terminal, and its internal structure diagram may be shown in FIG. 6. The computer device includes a processor, a memory, a network interface, a display screen and an input device connected through a system bus. The processor of the computer device is used to provide computing and control capabilities. The memory of the computer device includes a non-volatile storage medium and an internal memory. The non-volatile storage medium stores a step system and a computer program. The internal memory provides an environment for the running of the step system and the computer program in the non-volatile storage medium. The network interface of the computer device is used for communicating with an external terminal via a network connection. The computer program is executed by the processor to implement the computer. The display screen of the computer device may be a liquid crystal display screen or an electronic ink display screen, and the input device of the computer device may be a touch layer covered on the display screen, or may be a key, a trackball, or a touch pad disposed on a housing of the computer device, or may also be an external keyboard, a touch pad, a mouse, or the like.

A person skilled in the art would understand that the structure shown in FIG. 6 is merely a block diagram of a part of the structure related to the solution of the present disclosure, and does not constitute a limitation to the computer device to which the solution of the present disclosure is applied, and the specific computer device may include more or less components than those shown in the figure, or combine some components, or have different component arrangements.

In an embodiment, a computer device is provided, which includes a memory on which a computer program is stored and a processor. The processor, when executing the computer program, implements the following steps.

A liveness search data obtained from a liveness search by a Doppler microwave sensor of the vehicle mounted liveness detection system is received, and an in-vehicle image captured by a camera of the vehicle mounted liveness detection system is received.

A liveness detection is performed on the liveness search data, and a liveness detection is performed on the in-vehicle image.

An in-vehicle liveness alarm operation is performed when a presence of liveness in the in-vehicle space is detected based on at least one of the liveness search data and the in-vehicle image.

In an embodiment, a computer readable storage medium having stored thereon a computer program is provided. The computer program, when executed by a processor, implements the following steps.

A liveness search data obtained from a liveness search by a Doppler microwave sensor of the vehicle mounted liveness detection system is received, and an in-vehicle image captured by a camera of the vehicle mounted liveness detection system is received.

A liveness detection is performed on the liveness search data, and a liveness detection is performed on the in-vehicle image.

An in-vehicle liveness alarm operation is performed when a presence of liveness in the in-vehicle space is detected based on at least one of the liveness search data and the in-vehicle image.

A person of ordinary skill in the art would understand that all or part of the processes of the method in the foregoing embodiments may be implemented by a computer program instructing relevant hardware. The computer program may be stored in a non-volatile computer readable storage medium. When the computer program is executed, the computer program may include the processes of the embodiments of the above method. Any reference to memory, storage, database or other media used in the embodiments provided by the present disclosure may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. As an illustration and not a limitation, RAM is available in a variety of forms, such as static RAM (SRAM), dynamic RAM (DRAM), synchronous DRAM (SDRAM), dual data rate SDRAM (DDRSDRAM), enhanced SDRAM (ESDRAM), synchronous link DRAM (Synchlink SLDRAM), rambus, direct RAM (RDRAM), direct rambus dynamic RAM (DRDRAM), and rambus dynamic RAM (RDRAM), and so on.

The technical features of the above embodiments can be combined arbitrarily. In order to make the description concise, all possible combinations of the technical features in the above embodiments are not described. However, as long as there is no contradiction in the combination of these technical features, it shall be considered to be the scope recorded in the specification.

The above embodiments merely express several embodiments of the present disclosure, and the description thereof is more specific and detailed, but cannot be construed as limiting the scope of the present disclosure. It should be noted that, for a person of ordinary skill in the art, several modifications and improvements can also be made without departing from the inventive concept, which all belong to the scope of protection of the present disclosure. Therefore, the scope of protection of the present disclosure shall be subject to the appended claims.

What is claimed is:

1. A vehicle mounted liveness detection system, comprising a Doppler microwave sensor, a camera, and an alarm controller;
    wherein the Doppler microwave sensor is configured to perform a liveness search on an in-vehicle space, to obtain a liveness search data, and to transmit the liveness search data to the alarm controller;
    the camera is configured to capture an in-vehicle image of the in-vehicle space and to transmit the in-vehicle image to the alarm controller;
    the alarm controller is configured to:
        perform a liveness detection on the liveness search data;
        perform a liveness detection on the in-vehicle image;
        determine that a presence of liveness in the in-vehicle space is detected based on the liveness search data when a first liveness detection result obtained by performing the liveness detection on the liveness search data meets a preset first alarm condition; and
        determine that a presence of liveness in the in-vehicle space is detected based on the in-vehicle image when a second liveness detection result obtained by performing the liveness detection on the in-vehicle image meets a preset second alarm condition; and
    the alarm controller is also configured to perform an in-vehicle liveness alarm operation when a presence of liveness in the in-vehicle space is detected based on at least one of the liveness search data or the in-vehicle image.

2. The liveness detection system of claim 1, wherein the Doppler microwave sensor and the camera are both built with an Internet of things (IOT) module;
    the Doppler microwave sensor is configured to transmit the liveness search data to the alarm controller through the IOT module; and
    the camera is configured to transmit the in-vehicle image to the alarm controller through the IOT module.

3. The liveness detection system of claim 1, wherein the alarm controller is further specifically configured to perform at least one of following in-vehicle liveness alarm operations:
    sending the in-vehicle image to a client to play the in-vehicle image at the client;
    sending a liveness reminder message to the client; or
    sending a notification to a telephone number of the client.

4. The liveness detection system of claim 1, wherein the camera is further specifically configured to:
    shoot an RGB in-vehicle image or an infrared in-vehicle image as the in-vehicle image;
    the Doppler microwave sensor is further specifically configured to:
    perform the liveness search using a signal within a liveness search frequency range; wherein the liveness search frequency range is a frequency range of a signal for searching for a liveness.

5. The liveness detection system of claim 1, wherein the alarm controller is further configured to:
    send a liveness detection start instruction to the Doppler microwave sensor and the camera to trigger the Doppler microwave sensor to perform a liveness search on the in-vehicle space and to trigger the camera to capture an in-vehicle image of the in-vehicle space.

6. A liveness detection method, applied to a vehicle mounted liveness detection system, wherein the method comprises:
    receiving a liveness search data obtained from a liveness search by a Doppler microwave sensor of the vehicle mounted liveness detection system, and receiving an in-vehicle image captured by a camera of the vehicle mounted liveness detection system;
    performing a liveness detection on the liveness search data, and performing a liveness detection on the in-vehicle image;
    performing an in-vehicle liveness alarm operation when a presence of liveness in the in-vehicle space is detected based on at least one of the liveness search data or the in-vehicle image;
    determining that a presence of liveness in the in-vehicle space is detected based on the liveness search data when a first liveness detection result obtained by performing the liveness detection on the liveness search data meets a preset first alarm condition; and
    determining that a presence of liveness in the in-vehicle space is detected based on the in-vehicle image when a second liveness detection result obtained by performing the liveness detection on the in-vehicle image meets a preset second alarm condition.

7. A liveness detection apparatus, comprising:
    a data receiving module, configured to receive a liveness search data obtained by a liveness search by the Doppler microwave sensor of the vehicle mounted liveness detection system, and to receive an in-vehicle image captured by the camera of the vehicle mounted liveness detection system;
    a liveness search module, configured to perform a liveness detection on the liveness search data and to perform a liveness detection on the in-vehicle image; and
    an alarm execution module, configured to perform an in-vehicle liveness alarm operation when a presence of liveness in the in-vehicle space is detected based on at least one of the liveness search data and the in-vehicle image, determine that a presence of liveness in the in-vehicle space is detected based on the liveness search data when a first liveness detection result obtained by performing the liveness detection on the liveness search data meets a preset first alarm condition; and determine that a presence of liveness in the in-vehicle space is detected based on the in-vehicle image when a second liveness detection result obtained by performing the liveness detection on the in-vehicle image meets a preset second alarm condition.

8. A computer device, comprising:
a memory on which a computer program is stored, and
a processor; wherein the processor, when executing the computer program, implements the steps of the method of claim 6.

9. A non-transitory computer readable storage medium having stored thereon a computer program, wherein the computer program, when executed by a processor, implements the steps of the method of claim 6.

* * * * *